United States Patent [19]

Kupchan et al.

[11] 3,896,111

[45] July 22, 1975

[54] ANSA MACROLIDES

[75] Inventors: S. Morris Kupchan, Charlottesville, Va.; Yasuo Komoda, Chiba, Japan; Gareth J. Thomas, Hitchin, England; William A. Court, Delhi, Canada

[73] Assignee: Research Corporation, New York, N.Y.

[22] Filed: Feb. 20, 1973

[21] Appl. No.: 333,940

[52] U.S. Cl. .......................... 260/239.3 T; 424/248
[51] Int. Cl. ............................................ C07d 99/02
[58] Field of Search .............. 260/239.3 P, 239.3 T; 424/248

[56] References Cited
OTHER PUBLICATIONS

Chemical Abstracts, Vol. 77, (1972), Item 164652 (e) abstracting Kupcahn et al., "J. Chem. Soc.", Chem. Commun. (1972) No. 19, pg. 1065.

Kupchan et al., "J. Am. Chem. Soc.", Vol. 94, No. 4, Feb. 23, 1972, pgs. 1354–1356.

*Primary Examiner*—Henry R. Jiles
*Assistant Examiner*—Robert T. Bond
*Attorney, Agent, or Firm*—Omri M. Behr

[57] ABSTRACT

There are provided Novel Ansa Macrolides derived from Maytenus Buchananii (Loes.) Wilczek and Maytenus ovatus. which possess high and surprising antileukaemic activity against P-388 lymphocytic leukemia in test animals at dosage levels of micrograms per kilogram body weight.

4 Claims, No Drawings

ANSA MACROLIDES

The invention described herein was made in the course of work under a grant or award from the Department of Health, Education and Welfare.

SUMMARY OF THE INVENTION

The ethanolic extracts of Maytenus ovatus and Maytenus Buchananii are subjected to a series of extraction and chromatographic purification steps to yield the macrolide Maytansine which was high antileukaemic activity. In the extraction of Maytenus ovatus certain unidentified but highly active antileukaemic factors are also isolated. These are present in greater quantity in Maytenus Buchananii, which also contains Maytansine. These active factors are structurally extremely similar to Maytansine and are designated as Maytanprine and Maytanbutine respectively and differ merely by a methyl group in the first case and two methyl groups in the second case from Maytansine. The general formula of the compounds is shown below.

DESCRIPTION OF THE PREFERRED EMBODIMENTS

In the process of the present invention dried fruits of Maytenus ovatus are ground in a hammer mill and extracted with 95% ethanol, suitably in a soxhlet extractor. The ethanol is removed in vacuo and the residue partitioned between ethylacetate and water. The ethylacetate extract is partitioned between 10% aqueous methanol and petroleum ether. The aqueous methanol fraction is isolated by removal of the solvent and the residue subjected to column chromatography on silica gel suitably on silic AR type gel. The product from the column chromatography is acetylated, suitably by treatment with acetic anhydride in pyridine followed by further column chromatography on silica gel, and preparative scale thin layer chromatography sequentially on alumina, silica gel, and silic AR. to provide a highly enriched concentrate. Early attempts to isolate this material and recrystalize it from alkanolic solutions met with no success. When methanol was utilized, a methyl derivative was produced, and in ethanolic solution an ethyl derivative was produced. In order to procure a analytically pure sample of Maytansine it was necessary

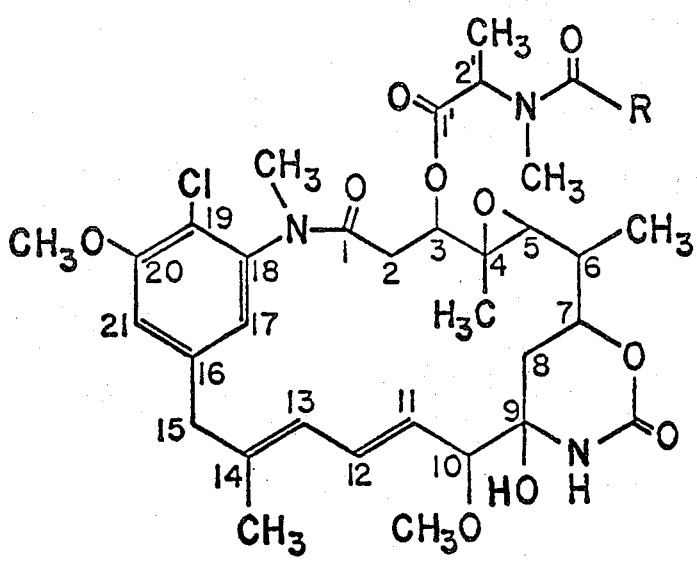

Maytansine (1) R = $CH_3$

Maytanprine (2) R = $CH_2CH_3$

Maytanbutine (3) R = $CH(CH_3)_2$

In the process of isolation, roots and wood of stems of Maytenus ovatus are extracted with 95% ethanol and subjected to a series of extractions and column fractionations shown in outline in FIG. 1 and discussed in greater detail herein below. The active materials isolated were tested for antitumor activity against p-388 lymphocytic leukemia in test animal tumor systems by means well recognized in the testing arts. The compounds disclosed and claimed herein demonstrate significant antileukaemic activity in the microgram per kilogram level, a level at which toxicity against the mammalian system itself is not a significant consideration.

to prepare the bromopropyl derivative by treatment with 3-bromopropanol in toluene sulfonic acid to yield the appropriate 3 bromopropyl Maytansine. Careful hydrolysis with 2N hydrochloric acid in aqueous methanol formed Maytansine itself which was used to seed a concentrate from the chromatographic procedures in ether methylene chloride.

While the more sophisticated purification procedures set forth herein below have obviated the necessity for preparation of the 3-bromopropyl Maytansine derivative, the presence of the heavy bromine atom in this derivative made possible the structural analysis of the compound by x-ray defraction crystalographic means.

Maytansine showed activity against the P-388 lymphocytic leukemia in a range of 20 to 100 micrograms/kg. Activity of a similar level against P-388 was exhibited by Maytanprine and Maytanbutine which, although present in the derivatives obtained from Maytanus ovatus, are present in more significant amounts in the ethanolic extracts from Maytanus Buchananii which are purified in a manner precisely similar to that utilized for the isolation of Maytansine.

EXAMPLE I

Extraction and Isolation of Maytansine from Maytenus ovatus

Extraction of plant material with 95% ethanol

Dried fruits (1 kg) of Maytenus ovatus were ground by a 10 inch Montgomery Ward Hammer Mill. The ground plant material was extracted in a Soxhlet extractor with 8 l. of 95% ethanol for 6 hours. The plant material was extracted again with 8 l. of fresh 95% ethanol for 15 hours. After a third 24-hour extraction of the same material with 8 l. of fresh 95% ethanol, all the solutions were combined.

Partition of 95% ethanol extract

The 95% ethanol extract of 1 kg of plant material was concentrated to a dark gum (A) at 40–50° in vacuo. Fraction A was treated with 300 ml. of ethyl acetate and 150 ml. of water, and the mixture was stirred very vigorously with a mechanical stirrer for 12 hours (because Fraction A contained a very viscous insoluble material). The suspension was filtered (filter papers had to be replaced several times because filtering speed was reduced by viscous insoluble material). The insoluble material was treated twice more with 100 ml. of ethyl acetate and 50 ml. of water and filtered. The layers of the combined filtrates were separated, and the aqueous solutions were washed twice with 50 ml. portions of ethyl acetate. The combined ethyl acetate solutions were washed with 50 ml. of water and concentrated at 40°–50° in vacuo. The residue, a dark gum, was partitioned between 50 ml. of 10% aqueous methanol and 150 ml. of Skellysolve B (bp 60°–68°). The aqueous methanol layer was extracted twice with 50 ml. portions of pet. ether*, and the combined pet.ether layers were washed with 30 ml. of 10% aqueous methanol. Evaporation of the pet. ether gave a dark green oil (B). The combined aqueous methanol fraction was carefully evaporated at 40°–50° in vacuo to give a dark gum (C). This evaporation was complicated by "bumping". *Pet. ether refers to Skellysolve B (bp 60°–68°).

Column chromatography of fraction C on SilicAR

Fraction C was dissolved in 30% methanol-chloroform (200 ml./100 g. of fraction C). Twice the weight of SilicAR (100–200 mesh) or silica gel (Merck 70–325 mesh) was added. After shaking the mixture, the solvent was evaporated at 40°–50° in vacuo. The residue was dried thoroughly in vacuo and placed on the top of a column prepared from SilicAR or silica gel (8 times the weight of fraction C) in chloroform. The top of the column was stirred with a rod if the eluting speed was reduced by fine material. Fractions 1–5 were eluted with chloroform, fractions 5–16 with 5% methanol-chloroform, and fractions 16–18 with methanol.[=1] Fractions 7–10 (D) were combined and submitted to treatment with acetic anhydride and pyridine.

[=1] Each fraction was eluted with one column volume. The solutions were evaporated at 40°–50° in vacuo, and the residues weighed individually.

Treatment of fraction D with acetic anhydride and pyridine

A solution of fraction D in pyridine (twice the weight of fraction D) was treated with acetic anhydride (5 times the weight of fraction D) at room temperature for 15 hours. Evaporation of acetic anhydride and pyridine at 40°–50° in vacuo gave a dark oil.

Column chromatography on SilicAR and then alumina of the material treated by acetylation The dark oil was dissolved in a minimum amount of chloroform and the chloroform solution was chromatographed on a column which was prepared from SilicAR or silica gel (5 times the weight of fraction D) in chloroform. Fractions 1–5 were eluted with chloroform, fractions 6–10 with 5% methanol-chloroform, and fractions 11–13 with methanol.[=1] Fraction E (7–10) was dissolved in a minimum amount of methylene-chloride and chromatographed on neutral alumina (Woelm, grade I, 5 times the weight of fraction E). Fractions 1–3[=2] were eluted with methylene chloride, 4–8 with 30% methanol-chloroform, and fractions 9–11 with methanol.[=1] Fractions 5–8 were combined (F).

[=1] Each fraction was eluted with one column volume. The solutions were evaporated at 40°–50° in vacuo, and the residues weighed individually.
[=2] Fractions 2 and 3 may contain active compounds, and should be separated for further study.

Partition of fraction F between ethyl acetate and hydrochloric acid:

A solution of fraction F in ethyl acetate (10 ml./g. of fraction F) was extracted with cold 2N hydrochloric acid (2 ml./g. of fraction F). The ethyl acetate layer was extracted twice with 2N hydrochloric acid (1 ml./g. of fraction F). The combined aqueous layers were washed with ethyl acetate (1 ml./g. of fraction F), basified with sodium bicarbonates, and extracted with ethyl acetate to give the alkaloid fraction (H). The combined ethyl acetate layers were washed with water until neutral and evaporated at 40°–50° in vacuo to yield an active fraction (G). [=3]

[=3] Exposure of active fractions to mineral acid should be minimized, for some sensitivity has been noted.

Preparative thin layer chromatography on alumina plates

Fraction G was purified further by preparative thin layer chromatography on aluminum oxide by the following procedure:[=4]

200–300 mg of fraction G/plate (Merck, 1.5 mm×20 cm×20 cm)
developing solvent: 7% methanol-ethyl acetate
development height: 15–17 cm After development and evaporation of solvent, the band corresponding to maytansine was scraped off and extracted repeatedly with 30% methanol-chloroform. The combined extracts were evaporated in vacuo. The resulting residue was dissolved in methylene chloride, filtered to remove aluminum oxide, and concentrated to dryness. The residue was again subjected to preparative thin layer chromatography on alumina by the same procedure, to afford fraction I.

[=4] $R_f$ values of maytansine and other active compounds were about 0.5 of this system.

Preparative thin layer chromatography on silica gel plates

Preparative thin layer chromatography of fraction I on silica gel was performed in the following manner. [=5]

ca. 100 mg of fraction I/plate (Merck, 2.0 mm × 20 cm × 20 cm)
developing solvent: 3% methanol-ethyl acetate
developing height: 15–17 cm

[=5] $R_f$ value of maytansine was about 0.2 in this system.

At this stage maytansine was separated from several related active compounds. It was convenient to collect two major fractions. Fraction J consisted of crude maytansine and fraction K, the other active compounds, which had higher $R_f$ values than maytansine. The active materials were eluted from the silica gel by repeated extraction with 10% methanol-ethyl acetate.

Fraction K contains Maytanprine and Maytanbutine isolated as set forth below.

Preparative thin layer chromatography on SilicAR plates

Fraction J was further purified by preparative thin layer chromatography on SilicAR in the following manner to yield the mantansine-rich fraction L. [=6]

5–6 mg of fraction J/plate(Mallinckrodt SilicAR, 0.25mm×20cm×20 cm)
developing solvent: 5% methanol-ethyl acetate
developing height: 15–17 cm
extracting solvent: 10% methanol-ethyl acetate

[=6] $R_f$ value of maytansine was 0.2–0.3 in this system.

Crystallization of maytansine

Fraction L was dissolved in a minimum amount of methylene chloride. To the methylene chloride solution was added an equal volume of ether and then n-hexane to slight turbidity. A seed crystal of maytansine was added and the solution was allowed to stand at room temperature for several hours. Plates separated, and these were filtered and recrystallized by the same procedure. Several recrystallizations were required to obtain pure maytansine (M). An additional crop of maytansine was obtained from the mother liquors.

EXAMPLE II

In accordance with the procedures of Example I the purification was carried out on a large scale using 100 kg of Fruits and providing the yields as set forth below.

| Fruits | | 100 kg. |
|---|---|---|
| Fraction | A | — |
| | B | — |
| | C | 1.9 kg. |
| | D | 570 g. |
| | E | — |
| | F | 41 g. |
| | G | — |
| | H | — |
| | I | 5.4 g. |
| | J | 0.6 g. |
| | K | 2.4 g. |
| | L | 0.2 g. |
| | M | 30 mg. |
| alumina plates | | 200 |
| silica gel plates | | 54 |
| SilicAR plates | | 100 |

EXAMPLE III

Extraction of plant material with 95% ethanol

Dried stem bark (1.0 kg) of Maytenus buchananii was ground with a 10 inch Montgomery Ward Hammer Mill. The ground plant material was extracted in a Soxhlet extractor with 8 l. of ethanol for 6 hours. The plant material was extracted again with 8 l. of fresh 95% ethanol for 15 hours. After a third 24-hour extraction of the same material with 8 l. of fresh 95% ethanol, all the solutions were combined.

Partition of 95% ethanol extract between ethyl acetate and water

The 95% ethanol extract of 1.0 kg of plant material was concentrated to a dark gum (P) at 40°–50° in vacuo. Fraction P was treated with 200 ml. of ethyl acetate and 150 ml. of water, and the mixture was stirred very vigorously with a mechanical stirrer for 12 hours (because Fraction P contained a very viscous insoluble material). The suspension was filtered (filter papers had to be replaced several times because filtering speed was reduced by viscous insoluble material). The insoluble material was treated twice more with 100 ml. of ethyl acetate and 50 ml. of water and filtered. The layers of the combined filtrates were separated, and the aqueous solutions were washed twice with 50 ml. portions of ethyl acetate. Ethyl acetate solutions were combined.

Extraction of ethyl acetate solution with 5% sodium hydroxide solution and then 2N hydrochloric acid solution The combined ethyl acetate solutions were extracted with 200 ml. of cold 5% sodium hydroxide solution. The ethyl acetate layer was extracted four times with 50 ml. portions of cold 5% sodium hydroxide.

The combined aqueous layers were washed five times with 30 ml. portions of ethyl acetate, acidified with 3N hydrochloric acid solution and extracted with ethyl acetate (ethyl acetate for first extraction was added into acidic solution before basification) to give the acidic compounds (Q).

The combined ethyl acetate layers were extracted five times with 30 ml. portions of cold 2N hydrochloric acid solution. The combined aqueous layers were washed three times with 30 ml. portions of ethyl acetate, basified with sodium bicarbonate, and extracted with ethyl acetate (ethyl acetate for first extraction was added into acidic solution before basification) to afford alkaloids (R).

The combined ethyl acetate layers were washed with water until neutral and evaporated at 40°–50° in vacuo to yield Fraction S.

Treatment of Fraction S with acetic anhydride and pyridine

A solution of Fraction S in 10 ml. of pyridine was treated with 10 ml. of acetic anhydride at room temperature for 15 hours.

Evaporation of acetic anhydride and pyridine at 40°–50° in vacuo gave a dark oil.

Partition of the material treated by acetylation with 20% aqueous methanol and carbon tetrachloride The dark oil was treated with 50 ml. of 20% aqueous methanol and 50 ml. of carbon tetrachloride. Aqueous methanol layer was washed four times with 20 ml. portions of carbon tetrachloride. The combined carbon tetrachloride solutions were extracted seven times with 20 ml. portions of 20% aqueous methanol and evaporated to give Fraction T. Aqueous methanol layers were combined.

Partition of 20% aqueous methanol soluble material with 35% aqueous methanol and chloroform The combined aqueous methanol layers were treated with 44 ml. of water to give a 35% aqueous methanol solution and extracted with 50 ml. of chloroform. The aqueous methanol layer was washed four times with 20 ml. portions of chloroform and evaporated to afford Fraction U.

The combined chloroform layers were dried with sodium sulfate and evaporated to give Fraction V.

Isolation of Final Products

Fraction V is then subjected to the extraction procedures applied to Fraction F in Example I (supra) to yield Maytansine, Maytanprine and Maytanbutine.

WEIGHTS OF FRACTIONS P-V (PER KG.)

| Fraction P | — | 61–65 g. |
|---|---|---|
| Q | — | 3–5 g. |
| R | — | 0.4–0.6 g. |
| S | — | 16–20 g. |
| T | — | 18–23 g. |
| U | — | 50 mg. |
| V | — | 1.5–2.2 g. |

EXAMPLE IV (3 bromopropyl) - Maytansine

A portion of the concentrate from Fraction L was treated at room temperature with 3-bromopropanol-1 and toluene sulfonic acid in methylene chloride to yield the carbinolamine ether (3-bromopropyl)-maytansine (4): $C_{37}H_{51}BrClN_3O_{10}$; mp 176°–178°; IR (KBr) 5.76, 6.01, 6.34, 8.42, 9.29 μ.

EXAMPLE V

Analytically Pure Maytansine

Treatment of 3-bromopropyl maytansine with 2N hydrochloric acid in aqueous methanol afforded a crystalline hydrolysis product, which was used to seed a solution of concentrate A in ether-methylene chloride to yield maytansine (1) (0.2 mg/kg plant, 0.00002%): $C_{34}H_{46}ClN_3O_{10}$; mp 171°–172°; $[\alpha]_D^{26}$ –145° (c 0.055, $CHCl_3$); uv max (EtOH) 233 (ε 29,800), 243 (sh, ε 27,100), 254 (ε 27,200), 282 (ε 5,690), 290 nm (ε 5,520); ir (KBr) 5.75, 5.80, 6.02, 6.34, 8.42, 9.26 η; mass spectrum, m/e 630.2680, $C_{33}H_{43}ClN_2O_8$ [M-61 ($H_2O$ + $HNCO^8$)] = 630.2708; nmr ($CDCl_3$) τ 9.13 (3H, s, C4—$CH_3$), 8.66 (3H, d, J=6 Hz, C6—$CH_3$), 8.63 (3H, d, J=7 Hz, C2'—$CH_3$), 8.31 (3H, broad s, C14—$CH_3$), 7.85 (3H, s, C2'N—$COCH_3$), 7.79 (1H, dd, $J_{2,2}$=15, $J_{2,3}$=3 Hz, C2—H), 7.35 (1H, dd, $J_{2,2}$=15, 2,3=$J_{2,3}$=12 Hz, C2—H), 7.11 (3H, s, C2'N—$CH_3$), 6.96 (1H, d, $J_{5,6}$=9 Hz, C5-H), 6.87 (1H, d, $J_{15,15}$=13 Hz, C15—H), 6.78 (3H, s, C/N—$CH_3$), 6.62 (3H, s, C/O—$OCH_3$), 6.50 (1H, d, $J_{10,11}$=9 Hz, C/O—H), 6.47 (1H, s, OH), 6.33 (1H, d, $J_{15,15}$=13 Hz, C15—H), 6.01 (3H, s, C20—$OCH_3$), 5.72 (1H, m, C7—H), 5.21 (1H, dd, $J_{2,3}$=12, 3 Hz, C3—H), 4.65 (1H, q, J=7 Hz, C2'—H), 4.34 (1H, dd, $J_{10,11}$=9, $J_{11,12}$=15 Hz, C11—H), 3.76 (1H, broad s, C9N—H), 3.58 (1H, dd, $J_{11,12}$=15, $J_{12,13}$=11 Hz, C12—H), 3.30 (1H, broad d, $J_{12,13}$=11 Hz, C13—H), 3.25, 3.16 (2H, doublets, $J_{17,21}$=1.5 Hz, C17—H, (21—H), 9.20–7.50 (3H, C6—H, C8—$H_2$).

EXAMPLE VI

Summary of x-ray diffraction in analysis of Maytansine.

Crystals of 3-bromopropyl Maytansine belong to the orthorhombic system with space group $P2_12_12_1$ and have $a$ = 24.239(4), $b$ = 16.044(4), $c$ = 10.415(2) A. The unit cell contains four formula units of $C_{37}H_{51}BrClN_3O_{10}$, giving a calculated density of 1.34 g/cm³, in reasonable agreement with the observed value of 1.30 g/cm³. By diffractometry, using monochromatic Cu Kα radiation, scintillation counting, and pulse-height analysis, 952 independent intensities significantly above background were recorded.

The structure was solved by the heavy atom method. Refinement of the structural parameters was by block-diagonal least-squares methods using anisotropic thermal parameters only for the bromine atom and, following its identification in the molecule, the chlorine atom, to yield R = 0.101.

The assignment of absolute configuration was done by taking into account the anomalous scattering of the bromine and chlorine atoms. When Δf″ was included in the structure factor calculation the two alternate enantiomers yielded R = 0.103 and 0.101, a significant difference at the 99% level. Confirmation of the assignment was obtained by comparison of the observed intensity for 23 Friedel pairs of reflections. In each case the difference in intensity was in good agreement with that calculated for the chosen enantiomer.

The absolute configurations are 3S, 4S, 5S, 6R, 7S, 9S, 10R, 2'S.

The disposition of substituents about the various bond axes shows almost perfect minimization of the intramolecular repulsions so that no strong intermolecular forces seem to be involved in dictating the observed conformation of the molecule. The calculated e.s.d. in an atomic position is around $0.02_5$ A, corresponding to an e.s.d. in bond distance of about 0.04 A and in bond angle of about 3°. The r.m.s. deviation for equivalent C—C distances is closer to 0.06 A suggesting that the errors calculated from the least-squares matrices are underestimated. Thermal parameters in the macrocycle are physically reasonable, being between 2.6 and 8.0 $A_2$ but the substituent groups show stronger thermal vibrations with the bromine atom having an equivalent isotropic thermal parameter of 11 A².

The principal peaks in the mass spectra of 1–3 are listed in the Table; the compositions of the fragment ions were determined by high resolution m.s. The m.s. characteristics indicated that (2) and (3) have ansa macrolide structures similar to (1) except for differences in the R-groups of the ester side chains.

The relationships among the three compounds were confirmed by comparisons of their n.m.r. spectra. Thus, the n.m.r. spectra of (2) and (3) differed from that of (1)

TABLE

| | $M^+$–(a) | $M^+$–(a+b) | 485–($CH_3$) | 485–(Cl) | [(b)–(OH)]$^+$ | [(b)–(COOH)]$^+$ | $C_3H_8N^+$ | $C_2H_6N^+$ |
|---|---|---|---|---|---|---|---|---|
| | | | | Mass spectral characteristics$^a$ | | | | |
| 1 | 630 | 485 | 470 | 450 | 128 | 100 | 58 | 44 |
| 2 | 644 | 485 | 470 | 450 | 142 | 114 | 58 | 44 |
| 3 | 658 | 485 | 470 | 450 | 156 | 128 | 58 | 44 |

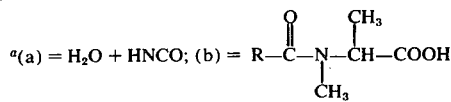

$^a$(a) = $H_2O$ + HNCO; (b) = R—C(=O)—N(—$CH_3$)—CH(—$CH_3$)—COOH solely in the signals corresponding to the terminal R-CO groups. The n.m.r. signals for the propionyl group of (2) [τ 8.82 (3H, t, J=7), 7.63 (1H, m), 7.59 (1H, m)] indicated the non-equivalence of the methylene protons, and this was confirmed by spin-decoupling studies. The n.m.r. signals for the isobutyryl group of (3) [τ 8.88 (3H, d, J=7), 8.81 (3H, d, J=7), 7.20 (1H, m)] suggested the non-equivalence of the two methyl groups, and this also was supported by the results of spin decoupling and solvent shift studies. The signals for the C-2' N-CH$_3$ of (3) [τ 7.13 (3/4 H, s), 7.08 (2¼ H, s)] indicated that the rate of rotation about the carbonyl to nitrogen bond was reduced by the steric interaction of the isopropyl group and the aromatic ring. Maytanprine (2) and Maytanbutine (3) showed antileukaemic activity against P-388 lymphocytic leukaemia of the same order as Maytansine.

EXAMPLE VII

Isolation of Maytanprine and Maytanbutine

The alcoholic extract of stems of Maytenus Buchananii (Loes.) Wilczek, collected in Kenya was fractionated by the procedure of Example I to yield a highly enriched concentrate. Preparative t.l.c. on silica gel afforded maytansine (1) (0.00015%) corresponding to Fraction L and two bands of higher R$_f$ corresponding to Fraction K. Purification of Fraction K by high pressure liquid chromatography yielded maytanprine (2) (0.00012%), C$_{35}$H$_{48}$ClN$_3$O$_{10}$, m.p. 169°-170°, [α]$_D^{30}$31 125°(c 0.0559,CHCl$_3$), and maytanbutine (3) (0.00009%), C$_{36}$H$_{50}$ClN$_3$O$_{10}$, m.p. 170-171°, [α]$_D^{30}$-122° (c 0.0492, CHCl$_3$). The i.r. and u.v. spectra of (2) and (3) were almost identical to those of (1).

In the following summary sheets, the following abbreviations are used:

| | | |
|---|---|---|
| EtOH | : | ethanol |
| EtOAc | : | ethyl acetate |
| H$_2$O | : | water |
| NaOH | : | sodium hydroxide |
| MeOH | : | methanol |
| CHCl$_3$ | : | chloroform |
| CHCl$_2$ | : | methylene chloride |
| CCl$_4$ | : | carbon tetrachloride |
| AcO$_2$ | : | acetic anhydride |
| H$^+$ | : | acid |
| Al$_2$O$_3$ | : | alumina |

SUMMARY FLOW SHEET FOR EXTRACTION AND ISOLATION OF MAYTANSINE FROM *Maytenus ovatus* and *Maytenus Buchananii*

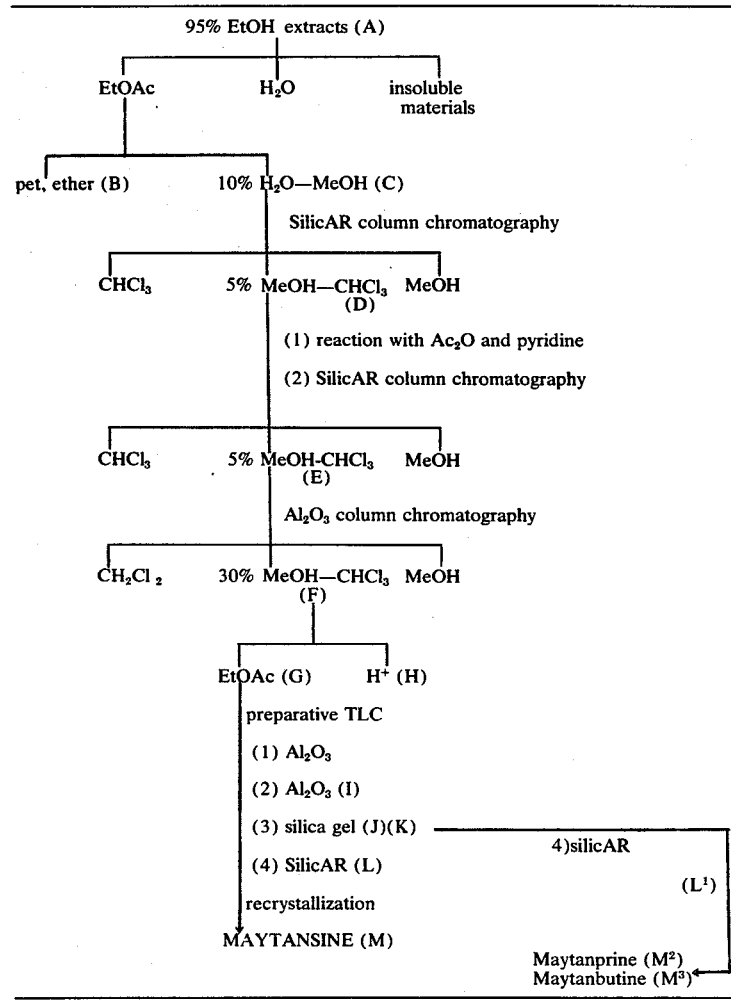

ALTERNATIVE PROCEDURE FOR EXTRACTION OF *MAYTENUS* ACTIVE PRINCIPLES

FLOW SHEET FOR EXTRACTION AND ISOLATION OF MAYTANSINE, MAYTANPRINE, AND MAYTANBUTINE FROM *Maytenus buchananii*

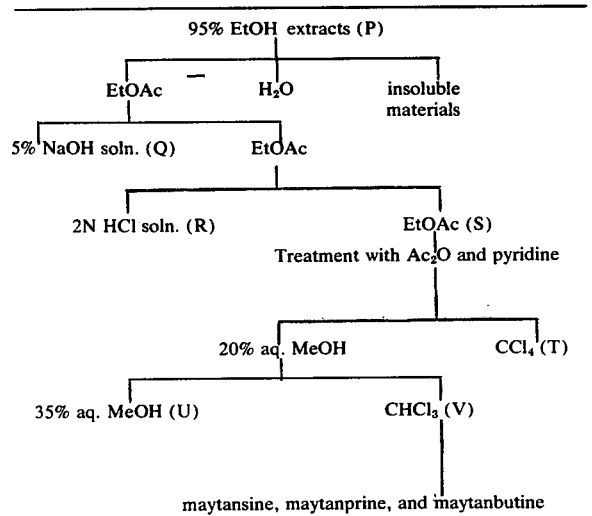

I claim:
1. A compound selected from the group having the formula:

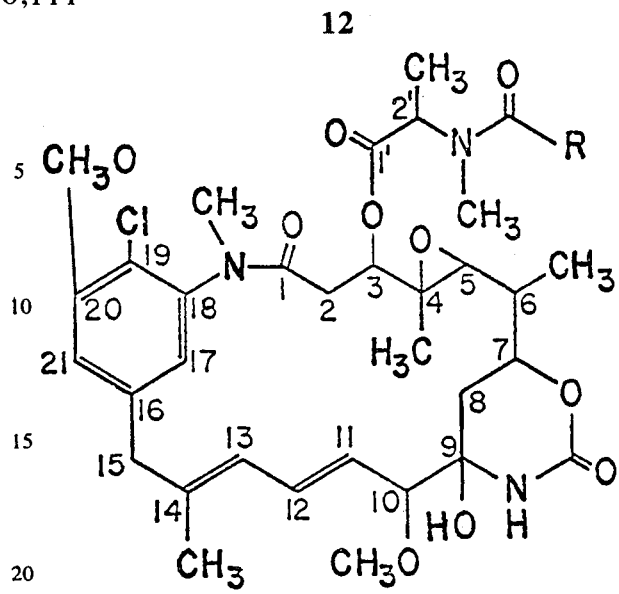

wherein R=CH$_3$, CH$_2$CH$_3$, or CH(CH$_3$)$_2$

2. Maytansine, being a compound of claim 1 wherein R is —CH$_3$.

3. Maytansine, Mayatansine, being a compound of claim 1 wherein R is —CH$_2$ CH$_3$.

4. Maytanbutine being a compound of claim 1 wherein R is CH(CH$_3$)$_2$.

* * * * *